United States Patent Office 2,963,497
Patented Dec. 6, 1960

2,963,497

2,6-DIMETHYL STEROIDS OF THE PREGNANE SERIES

Frank H. Lincoln, Jr., Kalamazoo, William P. Schneider, Kalamazoo Township, Kalamazoo County, and George B. Spero and John L. Thompson, Kalamazoo, Mich., assignors to The Upjohn Company, Kalamazoo, Mich., a corporation of Delaware No Drawing. Filed Dec. 22, 1958, Ser. No. 781,848

1 Claim. (Cl. 260—397.45)

This invention relates to 2,6-dimethyl compounds of the pregnane series having the following formula:

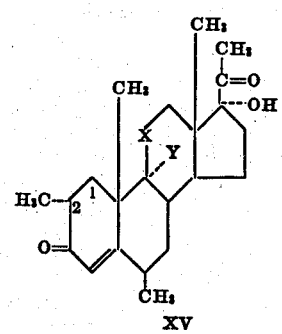

XV wherein X is the β-hydroxymethylene radical

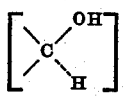

or the carbonyl radical (>C=O), Y is hydrogen or halogen, and the 1,2-carbon atom linkage is selected from the linkages consisting of single bond and double bond linkages.

The invention further relates to methods for the preparation of the above novel compounds.

The novel compounds of this invention possess valuable anti-rheumatoid arthritic, anti-inflammatory and glucocorticoid activities in marked degree. For example, 2α,6α - dimethyl - 11β,17α - dihydroxy - 4 - pregnene - 3,20-dione has an anti-inflammatory activity approximately thirty-five times that of hydrocortisone and a glucocorticoid activity twelve times that of hydrocortisone. The compounds of this invention are useful in the treatment of various arthritic conditions and in the treatment of inflammatory conditions of the skin, eyes, and ears of humans and valuable domestic animals, as well as contact dermatitis and other allergic reactions. In addition, the compounds of this invention cause a loss of salt and water which makes them especially valuable in the management of chronic congestive heart failure and in the treatment of cirrhosis of the liver, the nephrotic syndrome, and the treatment of eclampsia and pre-eclampsia.

The novel compounds of this invention can be prepared and administered to the animal organism in a wide variety of oral or parenteral dosage forms singly, or in admixture with other coacting compounds. They can be associated with a pharmaceutical carrier which can be a solid material or a liquid in which the compound is dissolved, dispersed, or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions, liquids and the like, with or without coacting antibiotics, germicides, or other materials forming advantageous compositions therewith.

The novel compounds of the present invention can be prepared in accordance with the following reactions:

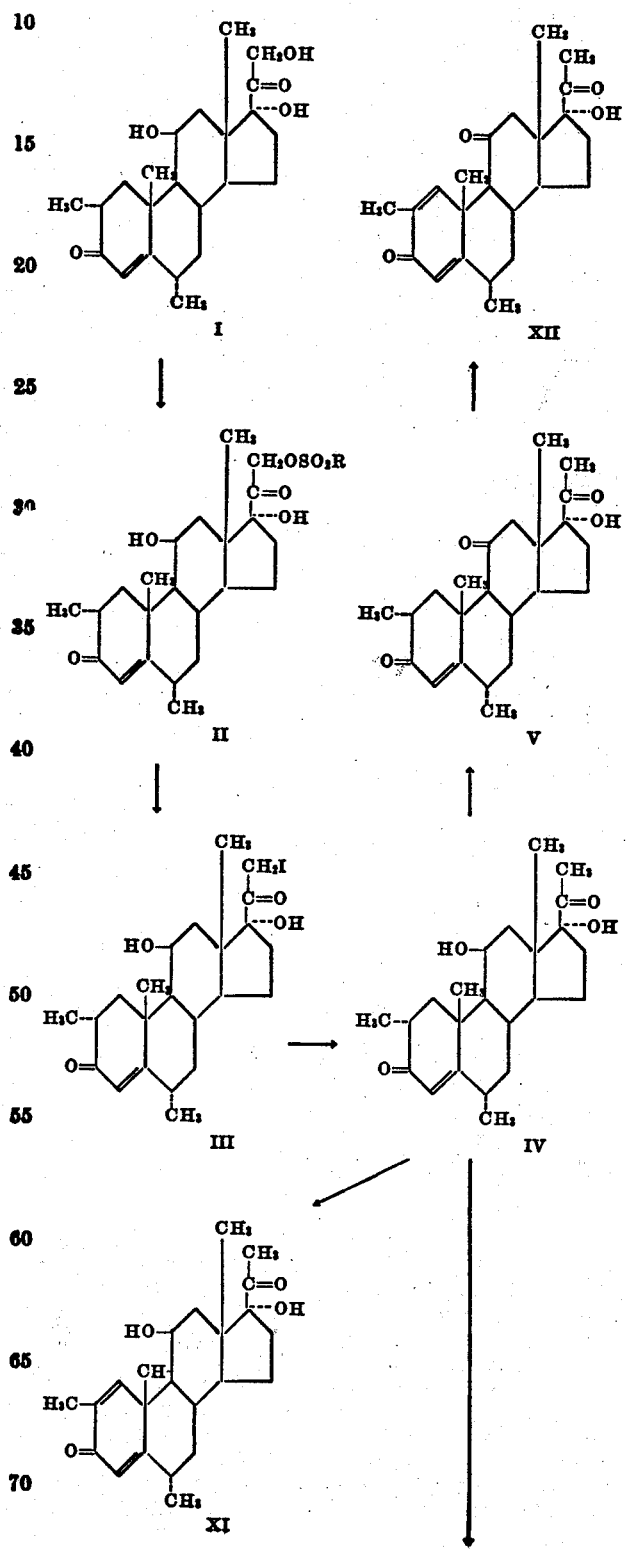

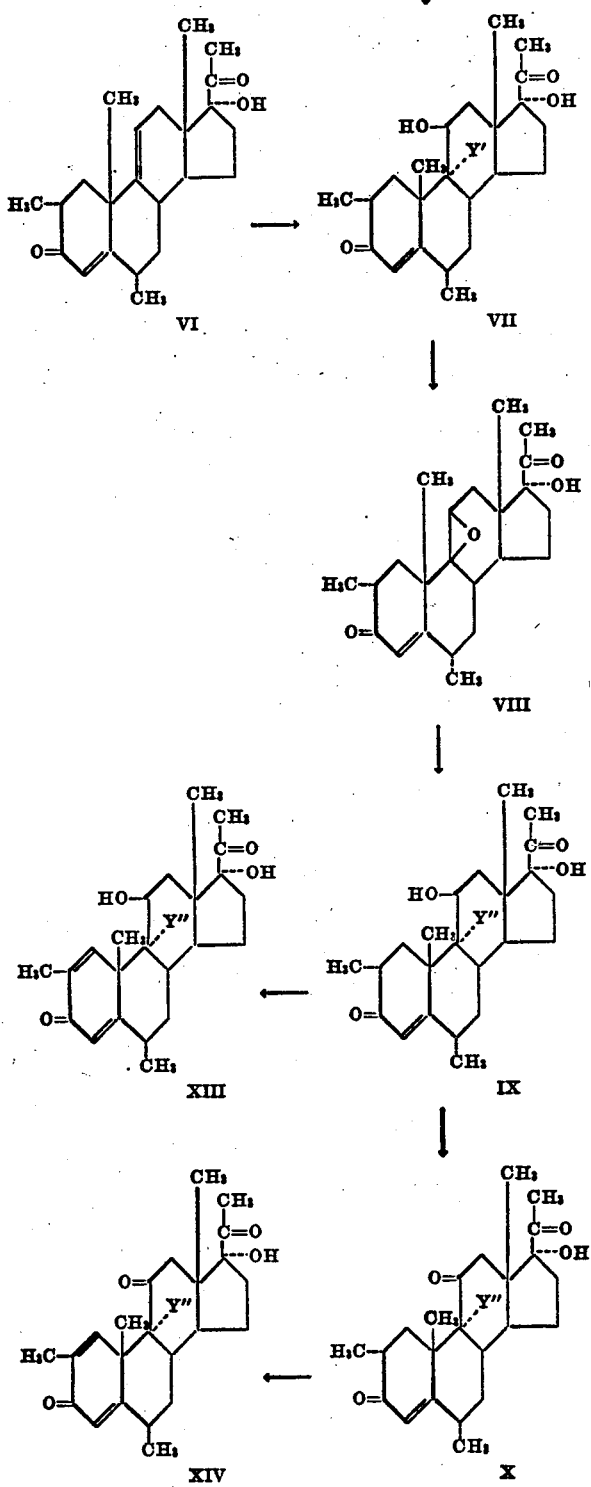

wherein Y' is bromo, chloro, or iodo, Y''' is fluoro, chloro, or bromo, and R is an organic radical, particularly a hydrocarbon radical of up to and including ten carbon atoms, such as, ethyl, phenyl, tolyl, naphthyl, and the like, with methyl preferred.

In accordance with the present invention, an 11-oxygenated 2α,6α - dimethyl-17α,21-dihydroxy-4-pregnene-3, 20-dione; for example, 2α,6α-dimethylhydrocortisone (1) is treated with an organic sulfonyl halide to obtain the corresponding 21-ester, a 21-alkyl or aryl sulfonate of 2α, 6α-dimethylhydrocortisone (II). The said 21-alkyl or aryl sulfonate is next reacted with an iodinating agent to obtain the corresponding 21-iodo steroid (III), which is dehalogenated with a reducing agent to produce 2α,6α-dimethyl-11β,17α-dihydroxy-4-pregnene-3,20-dione (IV). If desired, the 2α,6α-dimethyl-11β,17α-dihydroxy-4-pregnene-3,20-dione can be oxidized to give 2α,6α-dimethyl-17α-hydroxy-4-pregnene-3,11,20-trione (V). Alternatively, the 11-keto compound, corresponding otherwise to the starting material, can be employed to yield the product (V), eliminating the oxidation step. In this alternative method the intermediates (II) and (III) possess the 11-keto group instead of the 11β-hydroxy group.

The 2α,6α - dimethyl-11β,17α-dihydroxy-4-pregnene-3, 20-dione (IV), thus produced, is then dehydrated to give 2α,6α-dimethyl-17α-hydroxy - 4,9(11) - pregnadiene-3, 20-dione (VI), followed by treatment of the dehydration product with a source of hypohalous acid in which the halogen is bromine, chlorine, or iodine to produce 2α,6α-dimethyl-9α-halo-11β,17α-dihydroxy - 4 - pregnene-3,20-dione (VII). The said 9α-halo compound is then treated with a mild base to give 2α,6α-dimethyl-9β,11β-oxide-17α-hydroxy-4-pregnene-3,20-dione (VIII). Hydrohalogenation of the said 9,11-oxido compound, the hydrohalogenating agent being one which provides a source of hydrogen fluoride, hydrogen chloride, or hydrogen bromide, gives the corresponding 2α,6α-dimethyl-9α-halo-11β-17α-dihydroxy-4-pregnene-3,20-dione (IX), which can be oxidized to produce the corresponding 2α,6α-dimethyl - 9α - halo-17β-hydroxy-4-pregnene-3,11-20-trione (X).

The selected 2α,6α-dimethyl-11β,17α-dihydroxy-4-pregnene-3,20-dione (IV), 2α,6α - dimethyl - 17α-hydroxy-4-pregene-3,11,20-trione (V), 2α,6α - dimethyl - 9α-halo-11β,17α-dihydroxy-4-pregnene-3,20-dione (IX), or 2α,6α-dimethyl - 9α - halo-17α-hydroxy-4-pregnene-3,11,20-trione (X), thus produced, is 1-dehydrogenated by fermentative or chemical dehydrogenation to produce 2,6α-dimethyl-11β,17α-dihydroxy-1,4-pregnadiene - 3,20 - dione (XI), 2,6α-dimethyl - 17α - hydroxy-1,4-pregnadiene-3, 11,20-trione (XII), the corresponding 2,6α-dimethyl-9α-halo - 11β,17α - dihydroxy-1,4-pregnadiene - 3,20-dione (XIII) and the corresponding 2,6α-dimethyl-9α-halo-17α-hydroxy-1,4-pregnadiene - 3,11,20 - trione (XIV) respectively.

The starting material for the present invention, 2α,6α-dimethylhydrocortisone, can be prepared from 6α-methyl-11β,21-dihydroxy-4,17(20) - pregnadiene-3-one 21-acetate [Spero et al., J. Am. Chem. Soc., 78, 6213 (1956)] according to the procedures of Preparation 1–6, inclusive, contained herein below.

In carrying out the process of this invention, 2α,6α-dimethylhydrocortisone (I) is treated with an organic sulfonyl halide, such as, methanesulfonyl chloride, toluenesulfonyl chloride, toluenesulfonyl bromide, benzenesulfonyl chloride, naphthylsulfonyl chloride, or the like, the methanesulfonic acid halides, especially methanesulfonyl chloride, being preferred. In the preferred embodiment of this invention, the starting steroid is reacted with the alkyl or aryl sulfonyl halide in solution in a solvent, such as, pyridine, benzene, toluene, or the like. Where such solvents as benzene and toluene are employed, an amount of amine base such as pyridine at least equal to the molar amount of the sulfonyl halide should also be present to react with the halogen acid formed. Reaction of the alkyl or aryl sulfonyl halide is conducted preferably at a temperature between minus ten and plus sixty degrees centigrade, provided that at the lower temperature the solvent has not solidified. Thus, for pyridine, diozane, toluene, or the like, temperatures in the range of zero to ten degrees centigrade can be used, while for benzene only temperatures above five degrees centigrade are suitable because of the relatively high freezing point of benzene. The reaction time is usually between about thirty minutes and 24 hours, after which the product, 2α,6α-dimethylhydrocortisone 21-alkyl or aryl sulfonate (II), is recovered in a conventional manner, such as, for example, by evaporating the solvent until a solid residue is obtained or by diluting the reaction mixture and precipitating the product with water and dilute hydrochloric acid.

The 21-iodo compound (III) is prepared by reacting the said 21-alkyl or aryl sulfonate with an iodinating agent such as an alkali metal iodide, e.g., sodium, potassium or lithium iodide in an oxygenated hydrocarbon solution, e.g., an alkanone solution such as acetone. A molar excess of the iodide (three to twenty moles of iodide per mole of steroid) is generally preferred for this reaction. The reaction mixture containing the 21-alkyl or aryl sulfonate and the alkali metal iodide in solution is heated to reflux for a period of about three to thirty minutes. The thus produced 2α,6α-dimethyl-11β-17α-dihydroxy-21-iodo-4-pregnene-3,20-dione (III) can then be isolated by evaporating the solvent. For the subsequent reaction, the 21-iodo compound can be used either in purified form as a product of recrystallization from such organic solvents as acetone, ethanol, or the like, or it can be employed directly as a crude product in the next step of the synthesis.

The 2α,6α-dimethyl-11β,17α-dihydroxy-21-iodo-4-pregnene-3,20-dione (III) is dehalogenated at the 21-position by reaction with a reducing agent such as sodium or potassium thiosulfate, bisulfite or sulfite, or zinc and acetic acid, or the like. In the preferred embodiment of the invention, the crude 21-iodide is slurried with zinc and acetic acid and the mixture stirred at room temperature for a period of five minutes to two hours. After dilution with water, the product is isolated from the reaction mixture by conventional methods, such as by filtration or extraction with a water-immiscible organic solvent, e.g., ether, benzene, methylene chloride, ethylene chloride, carbon tetrachloride, cholorform, hexane, heptane, or the like, and evaporating the solvent therefrom. Purification of the thus obtained 2α,6α-dimethyl - 11β,17α-dihydroxy-4-pregnene-3,20-dione (IV) can be carried out in the usual manner, such as, by chromatography over Florisil synthetic magnesium silicate followed by recrystallization from ether, acetone, methanol, ethanol, Skellysolve B (brand of hexane hydrocarbons) or the like.

The foregoing procedures can likewise be conducted on the 11-keto compounds corresponding to each of the starting materials therein.

The oxidation of 2α,6α-dimethyl-11β,17α-dihydroxy-4-pregnene-3,20-dione (IV) can be carried out by a variety of methods, such as, for example, by oxidizing the said 2α,6α-dimethyl-21-desoxy steroid in acetic acid solution with chromic anhydride, using molar quantities or a slight excess, or employing a haloamide or haloimide of an acid, such as, N-bromoacetamide, N-chlorosuccinimide, or N-bromosuccinimide in pyridine, dioxane, or other solvent solutions. After conclusion of the desired oxidation, the oxidant is generally destroyed by addition of methyl alcohol, ethyl alcohol, or the like, when chromic acid is the oxidizing agent, and an alkali bisulfite when N-bromosuccinimide or other N-haloacylimides or amides are used. Thereafter, 2α,6α-dimethyl-17α-hydroxy-4-pregnene-3,11,20-trione (V) is recovered by conventional means, such as, precipitation from a cold water solution or extraction with water-immiscible solvents, e.g., methylene chloride, ethylene chloride, chloroform, carbon tetrachloride, ether, benzene, toluene, and the like, and if desired, the product can be further purified by recrystallization, chromatography, or both.

2α,6α - dimethyl - 11β,17α - dihydroxy - 4 - pregnene-3,20-dione (IV) is dehydrated to give 2α,6α-dimethyl-17α-hydroxy-4,9(11)-pregnadiene-3,20-dione (VI) by methods known in the art, e.g., by a dehydrating agent, such as, phosphorous oxychloride, thionyl chloride, hydrochloric acid or sulfuric acid and acetic acid, or by pyrolysis as shown in U.S. Patents 2,640,838 and 2,640,839, or the dehydration can be effected by the preferred method of reacting the 2α,6α-dimethyl-11β,17α-dihydroxy-4-pregnene-3,20-dione with a carboxylic acid N-haloamide or N-haloimide, wherein the halogen is bromine or chlorine, in an organic base either with or followed by anhydrous sulfur dioxide. Examples of such N-haloamides or N-haloimides are N-chloroacetamide, N-bromoacetamide, N-chlorosuccinimide, N-bromosuccinimide, 3-bromo-5,5-dimethylhydantoin, 1,3-dibromo-5,5-dimethylhydantoin, and the like, N-bromoacetamide being preferred. The organic bases employed as solvents in the above reaction are generally tertiary amines wherein the amino nitrogen is a member of an aromatic ring, such as the pyridines and lower fatty amides, pyridine being preferred. Normally, an amount in excess of a molar equivalent of organic base calculated on the basis of the quantity of starting steroid is employed. The sulfur dioxide is advantageously employed in substantially anhydrous form, inasmuch as the presence of water tends to decrease the yield of dehydrated product. The temperature of the reaction is generally between minus forty and plus seventy degrees centigrade, the lower limit being determined by the solubility of the substituents in the solvent selected and the upper limit by the amount of side reaction which normally accompanies reactions involving halogen compounds at higher temperatures. Ordinarily, room temperatures are preferred for convenience and because of the consistently high yields of end product which are obtained. A reaction time between about five minutes and three hours is usually employed, the specific temperature at which the reaction is conducted being determinative of the reaction time. Care should be taken to avoid reaction conditions which will dehydrate the labile 17α-hydroxy group.

The thus-obtained dehydration product is converted to 2α,6α - dimethyl - 9α - halo - 11β,17α - dihydroxy - 4-pregnene-3,20-dione (VII) by reaction with a hypohalous acid. The hypohalous acid is usually produced in situ by reaction of an acid with an N-haloamide or N-haloimide wherein the halogen is bromine, chlorine, or iodine. The 2α,6α-dimethyl-17α-hydroxy-4,9(11)-pregnadiene-3,20-dione is dissolved in an organic solvent, such as methylene chloride, tertiary butyl alcohol, dioxane, tertiary amyl alcohol, or the like, and reacted at room temperature with the hypohalous acid releasing agent, which includes N-bromoacetamide, N-chloroacetamide, N-bromosuccinimide, N-iodosuccinimide, N-chlorosuccinimide, and the like, in the presence of an acid, such as, perchloric acid, dilute sulfuric acid, and the like. N-bromoacetamide in tertiary butyl alcohol with perchloric acid and water are the preferred reagents for this reaction. Normally, the halogenation is conducted at room temperatures, between fifteen and thirty degrees centigrade, although temperatures on either side of this range are operative. The reaction period may vary from about five minutes to one hour. At the conclusion of the desired reaction, the excess hypohalous acid is destroyed by the addition of sulfites or hydrosulfites, sodium sulfite being normally employed. The resulting 2α,6α-dimethyl-9α-halo-11β,17α-dihydroxy-4-pregnene-3,20-dione (VII), in which the halogen is bromine, chlorine, or iodine, can be isolated from the reaction mixture by conventional methods, such as, by adding an excess of water and extracting the product with organic solvents or recovering the precipitated compound by filtration or by concentrating the reaction mixture under reduced pressure and allowing the product to crystallize. The crude reaction product may be employed directly in the next step of the process.

The 9α-halo compound (VII), as defined above, is then treated with a weak base, potassium acetate being preferred. The reaction is conducted in an inert solvent, such as, methanol, ethanol, acetone, dioxane, carbon tetrachloride, chloroform, and the like. The reaction takes place over a rather wide range of temperatures, normally from about minus fifteen degrees to the boiling point of the reaction mixture, the range between zero degrees and sixty degrees centigrade being most convenient. The reaction time may be varied considerably, depending on the temperatures employed, a period of reflux of from about eight to twenty hours producing satisfactory yields, with about eighteen hours usually being sufficient. The reaction mixture is concentrated, cooled, and diluted with water when water-miscible to give 2α,6α-dimethyl-9β,11β-oxido-17α-hydroxy-4-pregnene-3,20-dione (VII).

In the epoxide opening step, the 9,11-oxido compound (VIII) is reacted with an acid halide, such as, hydrogen fluoride, hydrogen chloride, or hydrogen bromide, hydrogen fluoride being preferred, to produce the corresponding 2α,6α-dimethyl - 9α - halo - 11β,17α-dihydroxy-4-pregnene-3,20-dione. The epoxide opening and hydrohalogenation is usually conducted at temperatures between about minus seventy and room temperature, the preferred limits being between about minus forty and zero degrees centigrade. Advantageously, the steroid is first dissolved in an organic solvent, such as, tetrahydrofuran, methylene chloride, and the like. The reaction time is usually from about one to 24 hours, with one to five hours being required at the preferred temperatures. After the reaction is complete, the mixture is poured into water and neutralized with a dilute base, such as, dilute sodium or potassium hydroxide, or a bicarbonate, such as, sodium bicarbonate, potassium bicarbonate, or the like. The reaction mixture is then extracted in the usual manner, such as, with methylene chloride, and the corresponding 2α,6α - dimethyl - 9α - halo - 11β,17α - dihydroxy - 4-pregene-3,20-dione (IX) recovered in a purified form by recrystallization or chromatography.

The selected 2α,6α-dimethyl-9α-halo-11β,17α-dihydroxy-4-pregnene-3,20-dione (IX) can be oxidized in accordance with the procedures described above for the oxidation of compound IV to compound V to give the corresponding 2α,6α - dimethyl-9α-halo-17α-hydroxy-4-pregnene-3,11,20-trione (X).

The 1-dehydrogenation of 2α,6α-dimethyl-11β,17α-dihydroxy-4-pregnene-3,20-dione (IV), 2α,6α-dimethyl-17α-hydroxy-4-pregnene-3,11,20-trione (V), the selected 2α,6α - dimethyl - 9α - halo - 11β,17α - dihydroxy - 4-pregnene-3,20-dione (IX), and the selected 2α,6α-dimethyl-9α-halo-17α-hydroxy-4-pregnene-3,11,20 - trione (X) to obtain the corresponding 1-dehydro compounds, i.e., 2,6α-dimethyl-11β,17α-dihydroxy-1,4-pregnadiene-3,20-dione (XI), 2,6α-dimethyl-17α-hydroxy-1,4-pregnadiene-3,11,20-trione (XII), the corresponding 2,6α-dimethyl-9α-halo-11β,17α-dihydroxy-1,4-pregnadiene - 3,20-dione (XIII), and the corresponding 2,6α-dimethyl-9α-halo-17α-hydroxy-1,4-pregnadiene-3,11,20-trione (XIV), respectively, can be carried out by fermentative or chemical dehydrogenation. Microorganisms, such as, for example, Septomyxa, Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaearia, Cucurbitaria, Nocardia, and enzymes of fungi of the family Tuberculariaceae can be used under fermentation conditions well known in the art (e.g., U.S. 2,602,769) and, furthermore, illustrated by Examples 9–12 herein.

When Septomyxa is used to effect the dehydrogenation, it is advantageous to use with the substrate and medium a steroid promoter, such as, progesterone, 3-ketobisnor-4-cholen-22-al, 3-ketobisnorcholenic acid, 11β,21-dihydroxy-1,4,17(20)-pregnatrien-3-one, and the like.

The chemical dehydration can be carried out with selenium dioxide according to known procedures [e.g., Meystre et al., Helv. Chim. Acta, 39, 734 (1956)].

The order of steps for the preparation of the products of the present invention are susceptible of variation without departing from the basic concepts of the process.

The following preparations and examples are illustrative of the process and products of this invention but are not to be construed as limiting.

PREPARATION 1

*2 - ethoxyoxalyl - 6α - methyl - 11β,21 - dihydroxy - 4,17-(20)-pregnadien-3-one sodium enolate*

In an atmosphere of nitrogen, 0.76 g. of ethyl oxalate followed by 0.205 g. of sodium methoxide (25% solution in methanol) was added to 1.0 g. of 6α-methyl-11β, 21-dihydroxy-4,17(20)-pregnadien-3-one 21-acetate, dissolved in 16 ml. of t-butanol. The temperature of addition was 65° C., and the reaction mixture was allowed to stir for a period of 10 to 15 minutes during which period the temperature dropped to 25° C. Sixteen ml. of ether was added, and stirring was continued for an additional period of 30 minutes. The product, 2-ethoxyoxalyl-6α-methyl-11β,21-dihydroxy-4,17(20)-pregnadien-3-one sodium enolate, was filtered and washed with ether. It was recovered as a yellow solid, yield 1.3 g.

PREPARATION 2

*2 - ethoxyoxalyl - 2,6α - dimethyl - 11β,21 - dihydroxy-4,17(20) - pregnadien - 3 - one*

A reaction mixture was prepared consisting of 1.3 g. of 2-ethoxyoxalyl-6α-methyl-11β,21-dihydroxy-4,17(20)-pregnadien-3-one sodium enolate, 1.5 g. of potassium carbonate, 4.5 ml. of methyl iodide and 30 ml. of acetone. The mixture was allowed to stir for 66 hours and was then diluted with 100 ml. of water and extracted with methylene chloride. The extract was washed with salt water, dried, and evaporated. The residual product, 2-ethoxyoxalyl - 2,6α - dimethyl - 11β,21 - dihydroxy - 4,17(20)-pregnadien-3-one, was a light-colored solid.

PREPARATION 3

*2α,6α - dimethyl - 11β,21 - dihydroxy - 4,17(20) - pregnadien-3-one*

The total product of Preparation 2 above was dissolved in 20 ml. of methanol and the resulting solution added to a solution of 0.8 ml. of 25% sodium methoxide dissolved in methanol. The reaction mixture was stirred under an atmosphere of nitrogen for a period of two hours and was then diluted with 100 ml. of water and extracted with methylene chloride. The extract was washed with salt water, dried and evaporated to an oily residue, 2α,6α-dimethyl-11β,21-dihydroxy-4,17(20)-pregnadien-3-one.

PREPARATION 4

*2α,6α - dimethyl - 11β - hydroxy - 21 - acetoxy - 4,17(20)-pregnadien-3-one*

A reaction mixture was prepared, composed of the entire product of Preparation 3 above dissolved in 5 ml. of pyridine to which was added 10 ml. of acetic anhydride. The reaction mixture was permitted to stand for a period of 17 hours and then poured into ice water. The resulting oil was extracted with methylene chloride, and the extract washed successively with dilute hydrochloric acid, dilute sodium bicarbonate, and water. The solution was then dried and chromatographed on synthetic magnesium silicate. The column was eluted with 5% acetone-95% commercial hexane. Evaporation of the solvent yielded a crystalline residue which was recrystallized from dilute methanol to give 2α,6α-dimethyl-11β - hydroxy - 21 - acetoxy - 4,17(20) - pregnadien - 3-one, melting point 107 to 108° C.; $[\alpha]_D^{25}+96°$ (in chloroform);

$\lambda_{max}^{alcohol}$ 241 mμ

$a_M = 14,525$.

*Analysis.*—Calculated for $C_{25}H_{36}O_4$: C, 74.96; H, 9.06. Found: C, 74.72; H, 9.10.

PREPARATION 5

*2α,6α-dimethylhydrocortisone acetate*

A reaction mixture was prepared by dissolving 0.423 g. of 2α,6α-dimethyl-11β-hydroxy-21-acetoxy-4,17(20)- pregnadien-3-one in 20 ml. of t-butanol, adding 2.5 ml. of pyridine, 1.7 ml. of 1.95 molar N-methylmorpholine oxide peroxide in t-butanol and 2.0 mg. of osmium tetroxide. The reaction mixture was stirred at about 22° C. for eighteen hours and then concentrated to one-half its volume under reduced pressure. The reaction mixture was then diluted with 20 ml. of distilled water and extracted with methylene chloride. The extract was washed succesively with cold dilute hydrochloric acid, cold sodium bicarbonate, and water, and was then dried and evaporated to an oil (0.44 g.). The oil was dissolved in 40 ml. of methylene chloride and adsorbed on a column of synthetic magnesium silicate. The column was developed with 30 ml. fractions of Skellysolve B hexanes plus acetone according to the following:

| Fraction No. | Solvent |
|---|---|
| 1–5 | hexane +5% acetone. |
| 6–10 | hexane +7.5% acetone. |
| 11–15 | hexane +10% acetone. |
| 16–20 | hexane +15% acetone. |
| 21–25 | hexane +20% acetone. |

Fractions 10 through 16 (79 mg.) were combined, and recrystallized twice from ethyl acetate-hexane. The product, 33 mg., was pure 2α,6α-dimethylhydrocortisone acetate, melting point 187 to 193° C.

PREPARATION 6

2α,6α-dimethylhydrocortisone (I)

A solution of 5.3 g. (0.0122 mole) of 2α,6α-dimethylhydrocortisone acetate in 500 ml. of methanol was purged of oxygen by bubbling nitrogen through the solution for 5 minutes. A solution of 2.7 g. of potassium bicarbonate in 50 ml. of water, similarly freed of oxygen, was added with stirring. After 5 hours, 3.5 ml. of acetic acid and 75 ml. of water were added, and the solution was concentrated at reduced pressure until it became cloudy. The cloudy solution was then saturated with sodium chloride and extracted with methylene chloride. The methylene chloride extract was dried by filtering through sodium sulfate and evaporated to yield 5.0 g. of a colorless glass. The colorless residue was dissolved in ethyl acetate-Skellysolve B hexanes and crystallized to give colorless flakes of 2α,6α-dimethylhydrocortisone melting at 199 to 201° C.; yield 2.65 g. The mother liquor residues were predominantly 2α,6α-dimethylhydrocortisone (confirmed by a papergram analysis) but were difficult to crystallize. An analytical sample was obtained from ethyl acetate-Skellysolve B hexanes giving prisms of 2α,6α-dimethylhydrocortisone melting at 188 to 191° C.; $[\alpha]_D + 150°$ (chloroform);

$\lambda_{max}^{alc.}$ 241 mμ

$a_M$ 14,400.

*Analysis.*—Calculated for $C_{23}H_{34}O_5$: C, 70.74; H, 8.78. Found: C, 70.26; H, 8.81.

EXAMPLE 1

2α,6α-dimethylhydrocortisone 21-methanesulfonate (II)

A solution of 4.9 g. (0.0125 mole) of 2α,6α-dimethylhydrocortisone (I) in 30 ml. of pyridine was cooled to 0° C. and 1.7 ml. of methanesulfonyl chloride was added with swirling. The mixture was kept at 0–5° C. for 2 hours, then poured into a mixture of 20 ml. of concentrated hydrochloric acid, 200 ml. of water and ice. A white solid separated which was extracted into methylene chloride. The methylene chloride extract was washed with cold aqueous sodium bicarbonate solution, dried by filtration through sodium sulfate and evaporated to a brown gum containing crude 2α,6α-dimethylhydrocortisone 21-methanesulfonate.

EXAMPLE 2

2α,6α-dimethyl-11β,17α-dihydroxy-21-iodo-4-pregnene-3,20-dione (III) and 2α,6α-dimethyl-11β,17α-dihydroxy-4-pregnene-3,20-dione (IV)

The crude mesylate from Example 1 was dissolved in 75 ml. of boiling acetone and a solution of 5 g. of sodium iodide in 50 ml. of acetone was added. The mixture was stirred under reflux for 15 minutes and then evaporated under reduced pressure. Acetic acid was added to the thick syrupy residue containing 2α,6α-dimethyl-11β,17α-dihydroxy-21-iodo-4-pregnene-3,20-dione, and the slurry was stirred for 30 minutes. After adding 5 g. of zinc dust, stirring was continued for an additional 15 minutes. The mixture was filtered and the zinc residues were washed with methanol. The combined filtrate was diluted with water and extracted with methylene chloride. The methylene chloride extract was washed with sodium bicarbonate solution, dried, and evaporated to yield 3.56 g. of crude 2α,6α-dimethyl-11β,17α-dihydroxy-4-pregnene,3,20-dione as a yellow glass. The crude 2α,6α-dimethyl-11β,17α-dihydroxy-4-pregnene-3,20-dione was dissolved in methylene chloride and chromatographed on 175 g. of Florisil synthetic magnesium silicate. The column was developed and the eluate collected in 350 ml. fractions and evaporated according to the following:

| Fraction | Eluent | Residue |
|---|---|---|
| 1 | Methylene chloride | 0. |
| 2 | 6% Acetone—94% Skellysolve B hexanes. | 0. |
| 3 | do | 0. |
| 4 | do | 0. |
| 5 | 8% Acetone—92% Skellysolve B hexanes. | 15 mg. |
| 6 | do | 26 mg. crystalline. |
| 7 | do | 122 mg. crystalline. |
| 8 | do | 165 mg. crystalline. |
| 9 | do | 137 mg. crystalline. |
| 10 | do | 81 mg. crystalline. |
| 11 | do | 60 mg. crystalline. |
| 12 | do | 35 mg. crystalline. |
| 13 | do | 25 mg. |
| 14 | do | 22 mg. |
| 15 | 10% Acetone—90% Skellysolve B hexanes. | 20 mg. |
| 16 | | 10 mg. |
| 17 | | 10 mg. |
| 18 | 100% Acetone | 742 mg. |
| 19 | 100% Methanol | 350 mg. |
| Total | | 182 g. |

Fractions 6–12, inclusive, were combined (635 mg.) and recrystallized from acetone-Skellysolve B hexanes to give colorless flakes melting at 210 to 216° C. Recrystallization gave prisms melting at 213 to 216° C.; one spot by benzene-formamide papergram analysis; $[\alpha]_D + 107°$ (chloroform);

$\lambda_{max}^{alc.}$ 242 mμ

$a_M$ 14,500; and infrared absorption maxima in mineral oil mull of 3440, 3380, 3340, 1702, 1657, 1647, and 1612 cm.$^{-1}$.

*Analysis.*—Calculated for $C_{23}H_{34}O_4$: C, 73.76; H, 9.15. Found: C, 73.44; H, 9.22.

EXAMPLE 3

2α,6α-dimethyl-17α-hydroxy-4-pregnene-3,11,20-trione (V)

A solution is prepared containing 0.5 ml. of acetic acid, 25 mg. of 2α,6α-dimethyl-11β,17α-dihydroxy-4-pregnene-3,20-dione (IV), 10 mg. of chromic anhydride, and approximately 50 mg. of distilled water. The mixture is shaken several times and permitted to stand at room temperature (about 25° C.) until the reaction is complete. The reaction mixture is then poured into 10 ml. of water and refrigerated at about 5° C. The thus precipitated steroid product is collected and recrystallized twice from acetone to give light-colored crystals of 2α,6α-dimethyl-17α-hydroxy-4-pregnene-3,11,20-trione.

Alternatively, starting with 2α,6α-dimethylcortisone (prepared by oxidizing 2α,6α-dimethylhydrocortisone with a haloamide or haloimide such as N-bromoacetamide according to known procedures for oxidizing hydrocortisone to cortisone) and reacting this with methanesulfonyl chloride to produce the 21-methanesulfonate of 2α,6α-dimethylcortisone, then treating the said 21-methanesulfonate with sodium iodide in acetone to produce the 21-iodide, and treating the 21-iodide with zinc dust and acetic acid, as shown in Examples 1 and 2, is productive of 2α,6α-dimethyl-17α-hydroxy-4-pregnene-3,11,20-trione (V).

EXAMPLE 4

2α,6α-dimethyl-17α-hydroxy-4,9(11)-pregnadiene-3,20-dione (VI)

A reaction mixture is prepared by dissolving 500 mg. of 2α,6α-dimethyl-11β,17α-dihydroxy-4-pregnene-3,20-dione (IV) in 5 ml. of pyridine and adding 225 mg. of N-bromoacetamide in an atmosphere of nitrogen. The mixture is permitted to stand at room temperature (about 25° C.) under nitrogen until the reaction is complete whereupon it is cooled to 10–15° C. and sulfur dioxide gas is passed over the surface while shaking the mixture until the solution gives no color with acidified starth-iodine paper. The temperature is kept below 30° C. during the addition of the sulfur dioxide. After standing at room temperature for a period of about 15 minutes, the reaction mixture is poured into ice water and the resulting precipitate extracted with 50 ml. of ether. The ether extract is washed successively with dilute hydrochloric acid and water, dried, and evaporated to a solid residue. The residue is purified by recrystallization from a mixture of acetone and hexane to give 2α,6α-dimethyl-17α-hydroxy-4,9(11)-pregnadiene-3,20-dione, a crystalline solid.

EXAMPLE 5

2α,6α-dimethyl-9α-bromo-11β,17α-dihydroxy-4-pregnene-3,20-dione (VII)

To a solution of 330 mg. of 2α,6α-dimethyl-17β-hydroxy-4,9(11)-pregnadiene-3,20-dione (VI) in 5 ml. of methylene chloride is added 10 ml. of tertiary butyl alcohol, a solution of 0.83 ml. of 72% perchloric acid in 5.8 ml. of water, and a solution of 142 mg. of N-bromoacetamide in 2.5 ml. of tertiary butyl alcohol. The reaction mixture is stirred for a period of about 15 minutes at room temperature, whereupon a solution of 142 mg. of sodium sulfite in 7 ml. of water is added and the mixture is concentrated to a volume of about 25 ml. under reduced pressure at about 60° C. The concentrated mixture is cooled in an ice bath with stirring and 50 ml. of water is added, whereupon the crystalline product, 2α,6α-dimethyl-9α-bromo-11β,17α-dihydroxy-4-pregnene-3,20-dione, is separated as a light-colored crystalline solid.

Substitution of another N-haloamide or an N-haloimide, such as, N-iodosuccinimide or N-chlorosuccinimide for the N-bromoacetamide in the foregoing reaction is productive of the corresponding 9α-halo product, i.e., 2α,6α-dimethyl-9α-fluoro-11β,17α-dihydroxy-4-pregnene-3,20-dione and 2α,6α-dimethyl-9α-chloro-11β,17α-dihydroxy-4-pregnene-3,20-dione.

EXAMPLE 6

2α,6α-dimethyl-9β,11β-oxido-17α-hydroxy-4-pregnene-3,20-dione (VIII)

A mixture of 400 mg. of 2α,6α-dimethyl-9α-bromo-11β,17α-dihydroxy-4-pregnene-3,20-dione (VII), 400 mg. of potassium acetate, and 50 ml. of acetone is stirred and heated under reflux temperature until the reaction is complete. The reaction mixture is then concentrated to a volume of about 5 ml. on the steam bath. Ten milliliters of water is added to the mixture and the resulting crystalline product is separated by filtration to give light-colored crystals of 2α,6α-dimethyl-9β,11β-oxido-17α-hydroxy-4-pregnene-3,20-dione. The product can be further purified by recrystallization from acetone.

EXAMPLE 7

2α,6α-dimethyl-9α-fluoro-11β,17α-dihydroxy-4-pregnene-3,20-dione (IX)

To approximately 1.3 g. of liquid hydrogen fluoride contained in a polyethylene bottle and maintained at minus 60° C. in a Dry-Ice bath is added, portion-wise, a mixture of 500 mg. of 2α,6α-dimethyl-9β,11β-oxido-17α-hydroxy-4-pregnene-3,20-dione (XIII) in 2.3 ml. of tetrahydrofuran (distilled over sodium hydroxide) and 2 ml. of methylene chloride which had been similarly cooled in a Dry-Ice bath. The reaction mixture is then allowed to stand at zero to minus ten degrees centigrade until the reaction is complete. At the end of the reaction period, the reaction mixture is mixed cautiously with an excess of cold aqueous sodium bicarbonate solution, and the organic material is extracted with the aid of additional methylene chloride. The combined extracts are washed with water, dried over anhydrous sodium sulfate, and concentrated to give crystals of 2α,6α-dimethyl-9α-fluoro-11β,17α-dihydroxy-4-pregnene-3,20-dione. The product, thus obtained, can be purified by recrystallization from an organic solvent, such as, methylene chloride, acetone, acetone-hexane, and the like, to give substantially pure 2α,6α-dimethyl-9α-fluoro-11β,17α-dihydroxy-4-pregnene-3,20-dione, a crystalline solid. Alternatively, the product can be purified from methylene chloride solution by chromatography over Florisil synthetic magnesium silicate, which on elution and crystallization gives 2α,6α-dimethyl-11β,17α-dihydroxy-4-pregnene-3,20-dione, a crystalline solid.

Substitution of hydrogen chloride or hydrogen bromide for the hydrogen fluoride above is productive of the corresponding 9α-halo product, i.e., 2α,6α-dimethyl-9α-chloro-11β,17α-dihydroxy-4-pregnene-3,20-dione and 2α,6α-dimethyl-9α-bromo-11β,17α-dihydroxy-4-pregnene-3,20-dione, respectively.

EXAMPLE 8

2α,6α-dimethyl-9α-fluoro-17α-hydroxy-4-pregnene-3,11,20-trione, 2α,6α-dimethyl-9α-fluoro-17α-hydroxy-4-pregnene-3,11,20-trione, and 2α,6α-dimethyl-9α-bromo-17α-hydroxy-4-pregnene-3,11,20-trione (X)

Following the procedure of Example 3, above, and substituting as starting material 2α,6α-dimethyl-9α-fluoro-11β,17α-dihydroxy-4-pregnene-3,20-dione, 2α,6α-dimethyl-9α-chloro-11β,17α-dihydroxy-4-pregnene-3,20-dione, or 2α,6α-dimethyl-9α-bromo-11β,17α-dihydroxy-4-pregnene-3,20-dione for 2α,6α-dimethyl-11β,17α-dihydroxy-4-pregnene-3,20-dione is productive of 2α,6α-dimethyl-9α-fluoro-17α-hydroxy-4-pregnene-3,11,20-trione, 2α,6α-dimethyl-9α-chloro-17α-hydroxy-4-pregnene-3,11,20-trione, and 2α,6α-dimethyl-9α-bromo-17α-hydroxy-4-pregnene-3,11,20-trione, respectively, as crystalline solids.

EXAMPLES 9–12

1-dehydrogenation with Septomyxa affinis

Three 400 ml. portions of glucose-corn steep liquor medium having a pH of 4.6 and containing 1.0 g. of glucose per 100 ml. and 2.0 g. of corn steep liquor solids per 100 ml., are inoculated with Septomyxa affinis, A.T.C.C. 6737, and incubated in shaken flasks at room temperature for 48 hours. During this period a heavy fungal growth develops. Twenty-four liters of the same medium, to which is added 20 ml. of lard oil, containing 0.1 octadecanol as a defoamer, is inoculated with the combined volume of 1200 ml. of medium containing the fungal growth. Incubation of the resulting mixture is carried out at 28° C. with constant agitation and aeration for a period of 24 hours, whereupon the medium is divided into four equal portions labeled A through D. To portion A is slowly added 500 mg. of 2α,6α-dimethyl-11β,17α-dihydroxy-4-pregnene-3,20-dione (IV) plus 250 mg. of 3-ketobisnor-4-cholen-22-al dissolved in 60 ml. of propylene glycol. To portion B is slowly added 500 mg. of 2α,6α-dimethyl-17α-hydroxy-4-pregnene-3,11,20-trione (V) plus 250 mg. of 3-ketobisnor-4-cholen-22 al dissolved in 60 ml. of propylene glycol. To portion C is slowly added 500 mg. of 2α,6α-dimethyl-9α-fluoro-11β,17α-dihydroxy-4-pregnene-3,20-dione (IX) plus 250 mg. of 3-ketobisnor-4-cholen-22-al dissolved in 60 ml. of propylene glycol. To portion D is added slowly 500 mg. of 2α,6α-dimethyl-9α-fluoro-17α-hydroxy-4-pregnene-3,11,20-trione plus 250 mg. of 3-ketobisnor-4-cholen-22-al dissolved in 60 ml. of propylene glycol. Fermentation of the four portions is continued for 72 hours after which time the beers are extracted with chloroform at reflux. The extract of each portion is cooled and evaporated to a solid residue and the residue is dissolved in 500 ml. of ethylene dichloride. Each solution is then purified by chromatography over a Florisil synthetic magnesium silicate column. Each column is eluted and the fractions containing the desired product are evaporated and recrystallized from acetone-Skellysolve B hexanes to give, respectively, for portion A, 2,6α-dimethyl-11β,17α-dihydroxy-1,4-pregnadiene-3,20-dione (XI); portion B, 2,6α-dimethyl-17α-hydroxy-1,4-pregnadiene - 3,11,20 - trione (XII); portion C, 2,6α-dimethyl-9α-fluoro-11β,17α-dihydroxy-1,4-pregnadiene-3,20-dione (XIII); and portion D, 2,6α-dimethyl-9α-fluoro-17α-hydroxy - 1,4 - pregnadiene-3,11,20-trione (XIV).

In the same manner as in Examples 9–12, above, substituting 2α,6α-dimethyl-9α-chloro-11β,17α-dihydroxy - 4-pregnene-3,20-dione (IX), or 2α,6α-dimethyl-9α-bromo-11β,17α-dihydroxy-4-pregnene-3,20-dione (IX) for 2α,6α-dimethyl - 9α - fluoro-11β,17α-dihydroxy-4-pregnene-3,20 dione in portion C; and substituting 2α,6α-dimethyl-9α-chloro-17α-hydroxy-4-pregnene-3,11,20-trione or 2α,6α-dimethyl-9α-bromo-17α-hydroxy-4-pregnene-3,11,20 - trione for 2α,6α-dimethyl-9α-fluoro-17α-hydroxy - 4 - pregnene,3,11,20-trione in portion D is productive of the corresponding 1-dehydro-9α-halo-compound, i.e., portion C, 2,6α - dimethyl-9α-chloro-11β,17α-dihydroxy-1,4-pregnadiene-3,20-dione and 2,6α-dimethyl-9α-bromo-11β,17α-dihydroxy-1,4-pregnadiene-3,20-dione, respectively; and portion D, 2,6α-dimethyl-9α-chloro-17α-hydroxy-1,4-pregnadiene-3,11,20-trione and 2,6α-dimethyl-9α-bromo-17α-hydroxy-1,4-pregnadiene-3,11,20-trione, respectively.

Alternatively, starting with 1-dehydro-2α,6α-dimethylhydrocortisone or 1 - dehydro-2α,6α-dimethylcortisone, prepared by subjecting 2α,6α-dimethylhydrocortisone and 2α,6α-dimethylcortisone, respectively, to 1-dehydrogenation with *Septomyxa affinis* according to the procedures of Examples 9–12, and reacting the thus produced 1-dehydro compounds with methanesulfonyl chloride to produce the corresponding 21-methanesulfonate, then treating the selected 21-methanesulfonate with sodium iodide in acetone to produce the corresponding 21-iodide, and treating the selected 21-iodide with zinc dust and acetic acid, as shown in Examples 1 and 2, is productive of 2,6α-dimethyl-11β,17α-dihydroxy - 1,4 - pregnadiene-3,20-dione (XI) and 2,6α-dimethyl-17α-hydroxy-1,4-pregnadiene-3,11,20-trione (XII), respectively. The 2,6α-dimethyl-11β,17α-dihydroxy-1,4-pregnadiene - 3,20 - dione (XI) can be oxidized with chromic anhydride according to the procedure of Example 3 to give 2,6α-dimethyl-17α-hydroxy-1,4-pregnadiene-3,11,20-trione (XII).

Alternatively, substituting 2,6α-dimethyl-11β,17α-dihydroxy-1,4-pregnadiene-3,20-dione (XI) for 2α,6α-dimethyl-11β,17α-dihydroxy-4-pregnene-3,20-dione in Example 4 and following the procedures of Examples 4 through 7, there is produced as the final product of each example the corresponding 1-dehydro compound, giving ultimately in Example 7, 2,6ω-dimethyl-9α-fluoro-11β, 17α-dihydroxy-1,4-pregnadiene 3,20-dione, 2,6α-dimethyl-9α-chloro-11β,17α-dihydroxy-1,4-pregnadiene-3,20 - dione or 2,6α-dimethyl-9α-bromo-11β,17α-dihydroxy-1,4-pregnadiene-3,20-dione. The selected 2,6α-dimethyl-9α-halo-11β,17α-dihydroxy-1,4-pregnadiene-3,20-dione, thus produced, can be oxidized with chromic anhydride according to the procedure of Example 3 to give the corresponding 2,6α-dimethyl-9α-halo-17α-hydroxy-1,4-pregnadiene-3,11,20-trione, i.e., 2,6α-dimethyl-9α-fluoro-17α-hydroxy-1,4-pregnadiene-3,11,20-trione, 2,6α-dimethyl-9α-chloro-17α-hydroxy-1,4-pregnadiene-3,11,20-trione, and 2,6α-dimethyl-9α-bromo-17α-hydroxy-1,4-pregnadiene - 3,11,20-trione, respectively.

It is to be understood that the invention is not to be limited to the exact details of operation or exact compounds shown and described, as obvious modifications and equivalents will be apparent to one skilled in the art, and the invention is therefore to be limited only by the scope of the appended claim.

We claim:

2ω,6ω-dimethyl-11β,17α-dihydroxy - 4 - pregnene-3,20-dione.

References Cited in the file of this patent

UNITED STATES PATENTS

| | | |
|---|---|---|
| 2,865,935 | Schneider et al. | Dec. 22, 1958 |
| 2,867,632 | Lincoln et al. | Jan. 6, 1959 |
| 2,867,633 | Lincoln et al. | Jan. 6, 1959 |

UNITED STATES PATENT OFFICE
CERTIFICATION OF CORRECTION

Patent No. 2,963,497                              December 6, 1960

Frank H. Lincoln, Jr., et al.

It is hereby certified that error appears in the above numbered patent requiring correction and that the said Letters Patent should read as corrected below.

Column 10, in the table, third column, last item thereof, for "182 g." read -- 1.82 g. --; column 11, line 63, for "-9α-fluoro-", in italics, read -- -9α-iodo- --; in italics; column 12, line 47, for "-9α-fluoro-", in italics, read -- -9α-chloro- --, in italics; column 14, line 24, for "2,6ω-dimethyl-" read -- 2,6α-dimethyl- --; line 45, for "2ω,6ω-dimethyl-" read -- 2α,6α-dimethyl- --.

Signed and sealed this 6th day of June 1961.

(SEAL)
Attest:

ERNEST W. SWIDER                            DAVID L. LADD
Attesting Officer                              Commissioner of Patents